United States Patent
Ma (10) Patent No.: US 11,384,741 B2
(45) Date of Patent: Jul. 12, 2022

(54) STATOR ASSEMBLY, ELECTRIC MACHINE AND WIND TURBINE HAVING THE STATOR ASSEMBLY

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/042,863

(22) PCT Filed: Sep. 3, 2019

(86) PCT No.: PCT/CN2019/104142
§ 371 (c)(1),
(2) Date: Sep. 28, 2020

(87) PCT Pub. No.: WO2020/052467
PCT Pub. Date: Mar. 19, 2020

(65) Prior Publication Data
US 2021/0017965 A1    Jan. 21, 2021

(30) Foreign Application Priority Data
Sep. 14, 2018   (CN) .......................... 201811076191.4

(51) Int. Cl.
*F03D 80/60*     (2016.01)
*H02K 1/20*      (2006.01)
*H02K 7/18*      (2006.01)

(52) U.S. Cl.
CPC ............... *F03D 80/60* (2016.05); *H02K 1/20* (2013.01); *H02K 7/1838* (2013.01); *F05B 2240/122* (2013.01); *F05B 2260/209* (2013.01)

(58) Field of Classification Search
CPC ........ F03D 80/60; H02K 1/20; H02K 7/1838; F05B 2240/122; F05B 2260/209
See application file for complete search history.

(56) References Cited

U.S. PATENT DOCUMENTS

| 2003/0034701 A1 | 2/2003 | Weeber et al. |
| 2012/0205998 A1 | 8/2012 | Seibicke et al. |

(Continued)

FOREIGN PATENT DOCUMENTS

| CN | 201466941 U | 5/2010 |
| CN | 203645474 U | 6/2014 |

(Continued)

OTHER PUBLICATIONS

European Search Report in corresponding European Application No. 19859897.1 dated Jul. 28, 2021 (9 pages).

(Continued)

*Primary Examiner* — Viet P Nguyen
(74) *Attorney, Agent, or Firm* — Bayes PLLC (57) ABSTRACT

A stator assembly, an electric machine and a wind turbine having the stator assembly are provided. The stator assembly includes a stator iron core, a stator bracket supporting the stator iron core, and an air flow conveyer configured to convey a first cold air flow along the radial direction of the stator iron core to a radial side surface of the stator iron core opposite to an air gap side. The embodiment of the present disclosure enables two radial sides of the stator to be cooled at the same time. Thereby, the expansion and deformation of the stator iron core are reduced, the air gap is prevented from being narrowed, magnetic poles are protected from being (Continued)

baked by the high temperature of the stator, and the service life of the electric machine is prolonged.

20 Claims, 9 Drawing Sheets

(56) References Cited

U.S. PATENT DOCUMENTS

| | | | |
|---|---|---|---|
| 2017/0288500 A1 | | 10/2017 | Eriksen et al. |
| 2018/0019642 A1* | | 1/2018 | Wang ................. F03D 9/25 |

FOREIGN PATENT DOCUMENTS

| | | | |
|---|---|---|---|
| CN | 204334142 U | 5/2015 | |
| CN | 105515230 A | 4/2016 | |
| CN | 106451915 A | 2/2017 | |
| CN | 206670107 U | 11/2017 | |
| EP | 1286448 A1 | 2/2003 | |
| EP | 3226383 A1 | 10/2017 | |
| EP | 3252930 A1 | 12/2017 | |
| JP | 2002354766 A | 12/2002 | |
| JP | 2003324897 A | 11/2003 | |
| JP | 2014107905 A | 6/2014 | |
| WO | WO-2016119511 A1 * | 8/2016 | ............... H02K 1/20 |

OTHER PUBLICATIONS

International Search Report and Written Opinion issued in corresponding PCT Application No. PCT/CN2019/104142, dated Dec. 6, 2019, 8 pages.

First Office Action in corresponding Chinese Application No. 201811076191.4 dated Apr. 20, 2020 (15 pages).

Second Office Action in corresponding Chinese Application No. 201811076191.4 dated Sep. 22, 2020 (16 pages).

* cited by examiner

STATOR ASSEMBLY, ELECTRIC MACHINE AND WIND TURBINE HAVING THE STATOR ASSEMBLY

CROSS-REFERENCE TO RELATED APPLICATIONS

This application is a U.S. national phase of International Application No. PCT/CN2019/104142, filed on Sep. 3, 2019, which claims priority to Chinese Patent Application No. 201811076191.4, filed on Sep. 14, 2018. The entire contents of each of the above-identified applications are incorporated herein by reference.

TECHNICAL FIELD

The present application relates to the technical field of electric machines, and in particular to a stator assembly having a cooling ventilation structure, an electric machine having the stator assembly, and a wind turbine having the stator assembly.

BACKGROUND

In the conventional technology, the heat source member of the electric machine is usually cooled by introducing the cooling medium into the air gap between the stator and the rotor. For large electric rotating machinery such as wind turbines, forced convection heat transfer is usually performed to the heat source like the windings, and the cooling medium is forced, by high-power, large-scale (that is, large impeller diameters) fluid machinery (such as a ventilator), to enter the air gap between the stator and the rotor or the radial ventilation channel of the stator core winding. On the one hand, the cooling manner of introducing the cool airflow into the air gap cannot completely prevent the expansion and deformation of the stator; on the other hand, the fluid transport of the cooling medium and the wind-induced noise of the airflow causes severe impacts on the living beings in the natural environment, which is prohibited by the ecological regulations.

In addition, in the conventional technology, when the wind turbine is cooled, a partition-wall type heat exchanger is arranged in the nacelle, so as to cool the heat generating surfaces in the internal circulation chamber with the help of the ambient airflow of the external circulation, and the induced draft fan leads out the fluid which is cooled by the heat exchanger and diffuses the fluid by 360 degrees in the space of the tail portion of the nacelle. However, in this cooling manner, the losses of frictional resistance and local resistance along are large, which restricts the heat exchange rate of the heat generation step inside the electric machine, and therefore the risks of great temperature rise and threat against the stable performance of permanent magnet poles still exist in the key structure inside the electric machine, that is, the insulation structure.

SUMMARY

In order to solve the above problems in the conventional technology, a stator assembly having an airflow conveying device capable of cooling, by direct ejection, the radial side surface of the stator core opposite to the air gap side, an electric machine having the stator assembly and a wind turbine having the stator assembly are provided according to the present application.

According to one aspect of the present application, a stator assembly is provided, including a stator core and a stator bracket supporting the stator core, and the stator assembly further includes an airflow conveying device configured to convey a first cold airflow, in a radial direction of the stator core, to a radial side surface of the stator core opposite to an air gap side.

According to another aspect of the present application, an electric machine is provided, including the stator assembly as described above.

According to yet another aspect of the present application, a wind turbine is provided, including the stator assembly as described above.

By employing embodiments of the present application, another side of the stator opposite to the air gap can be cooled during the operation of the electric machine, so that both the two radial sides of the stator can be cooled, which reduces the expansion and deformation of the stator core, prevents the air gap from becoming narrow, and prevents the magnetic poles from being broiled due to high temperature of the stator, and thus protecting the magnetic poles and prolonging the service life of the electric machine.

Reference Numerals in the drawings:

| 100 | stator core, | 110 | dovetail groove, |
|---|---|---|---|
| 200 | stator bracket, | 210 | stand column, |
| 220 | enclosure plate, | 230 | second through hole, |
| 231 | guide member, | 240 | inner cylinder plate, |
| 250 | rib plate, | 260 | cavity, |

| | | | |
|---|---|---|---|
| 300 | ejection tube, | 310 | airflow inlet port, |
| 320 | nozzle, | 330 | throat, |
| 400 | vortex tube, | 410 | vortex chamber, |
| 420 | hot end tube segment, | 430 | variable-section flow channel, |
| 440 | cold end tube segment, | 450 | cold end orifice plate, |
| 460 | hot end valve, | 500 | stator core, |
| 530 | heat dissipation rib, | 600 | stator bracket, |
| 610 | stand column, | 640 | inner cylinder plate, |
| 650 | rib plate, | 660 | cavity, |
| 800 | backflow channel, | 910 | filter, |
| 920 | compressor, | 930 | compressed air collection tank, |
| 940 | branch tube, | 950 | hot airflow collection tank, |
| 50 | cold airflow confluence tank, | 60 | hot airflow confluence tank. |

DETAILED DESCRIPTION OF THE EMBODIMENTS

For those skilled in the art to better understand technical conceptions of the present application, specific embodiment of the present application will be further described in detail in conjunction with drawings and embodiments hereinafter. In the drawings, the same reference number always represents the same member.

Figure 1:
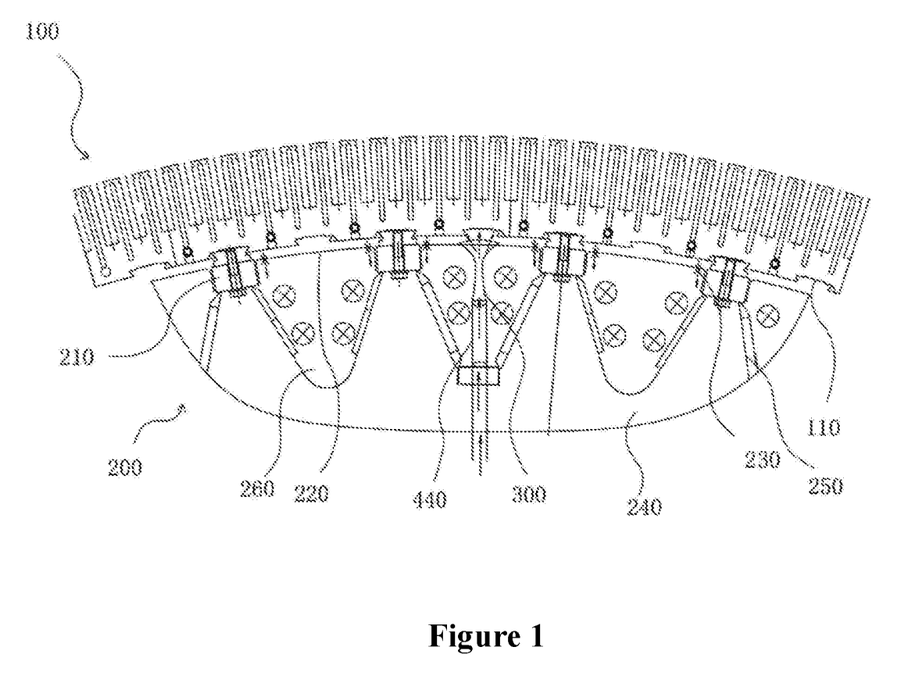
FIG. 1 is a sectional view showing a part of a stator assembly according to a first embodiment of the present application.

As shown in FIG. 1, in order to reduce eddy current loss and other losses, a stator core 100 of an electric machine is made by laminating ferromagnetic conductive sheets having large resistivity and small hysteresis loop areas after stamping and insulation treatment. In the conventional technology, when manufacturing the stator core, multiple fan-shaped silicon steel sheets are usually spliced in a circumferential direction and then superposed in an axial direction, stand columns (support columns) 210 of a stator bracket 200 is combined with a dovetail groove 110 on the silicon steel sheets through fasteners, the silicon steel sheets are fixed to a support enclosure plate 220 of the stator bracket along the circumferential direction, and two ends in the axial direction are clamped by a toothed pressing plate, so as to form a stator assembly including the stator core 100 and the stator bracket 200.

The inventor of the present application found through research that, magnetic poles and windings at two sides of an air gap between a stator and a rotor of the electric machine can be effectively cooled by introducing cold airflow into the air gap, however, for the stator core, the cold airflow is in direct contact with a radial end surface of an air gap side, while another radial end surface away from the air gap side is difficult to be cooled, resulting in uneven temperature distribution of the stator core in a radial direction, and a great thermal distribution difference between a radial outer side and a radial inner side. A portion of the stator core away from the air gap side is tend to expand and deform, which makes the air gap between the stator and the rotor become narrow.

In order to solve the above problems, technical solutions which innovate traditional cooling modes and traditional cooling structures of electromagnetic devices (such as a heat source of an electric machine core) are provided through embodiments of the present application, which cool a radial side surface of the stator core opposite to the air gap, so that both the two radial sides of the stator core are cooled at the same time, thereby reducing the thermal distribution difference between the two radial sides of the stator core. In addition, the stator bracket is also cooled, so as to reduce a cooling degree difference between the stator bracket away from the air gap side and core windings, and reduce a thermal distribution difference between the core windings and the stator bracket, thereby avoiding a change of the air gap between the stator and the rotor caused by the thermal expansion difference between the core windings and the stator bracket.

In order to facilitate illustration, in the following embodiments and accompanying drawings, a stator assembly according to an embodiment of the present application is shown by taking an inner stator of an electric machine as an example.

FIG. 1 schematically shows a part of the stator assembly of the electric machine, the stator assembly includes a stator core 100 and a stator bracket 200 supporting the stator core 100. Since the embodiments of the present application are intended to detailedly describe cooling of the radial inner side surface of the stator core opposite to the air gap side (the air gap between the stator and the rotor), only structures of the stator assembly of the electric machine are shown in the drawings, and other parts of the electric machine (for example, the rotor, the core windings and the like) are not shown. The stator core 100 can be formed by superposing multiple core laminate sheets (for example, silicon steel sheets), the stator core 100 is provided with tooth grooves, and the windings are arranged in the tooth grooves to face the rotor. The stator bracket 200 can be arranged at the radial inner side of the stator core 100 and the stator core 100 is fastened to the stator bracket 200.

The stator assembly according to the embodiments of the present application includes an airflow conveying device, and the airflow conveying device is configured for generating cold airflow and conveying the cold airflow to the radial side surface of the stator core opposite to the air gap (in an example of a generator having an outer rotor and an inner stator, the radial side surface can also be called a radial inner side surface, a root portion, a back portion or the like, of the stator core), so as to directly cool the radial inner side surface of the stator core.

Figure 2:
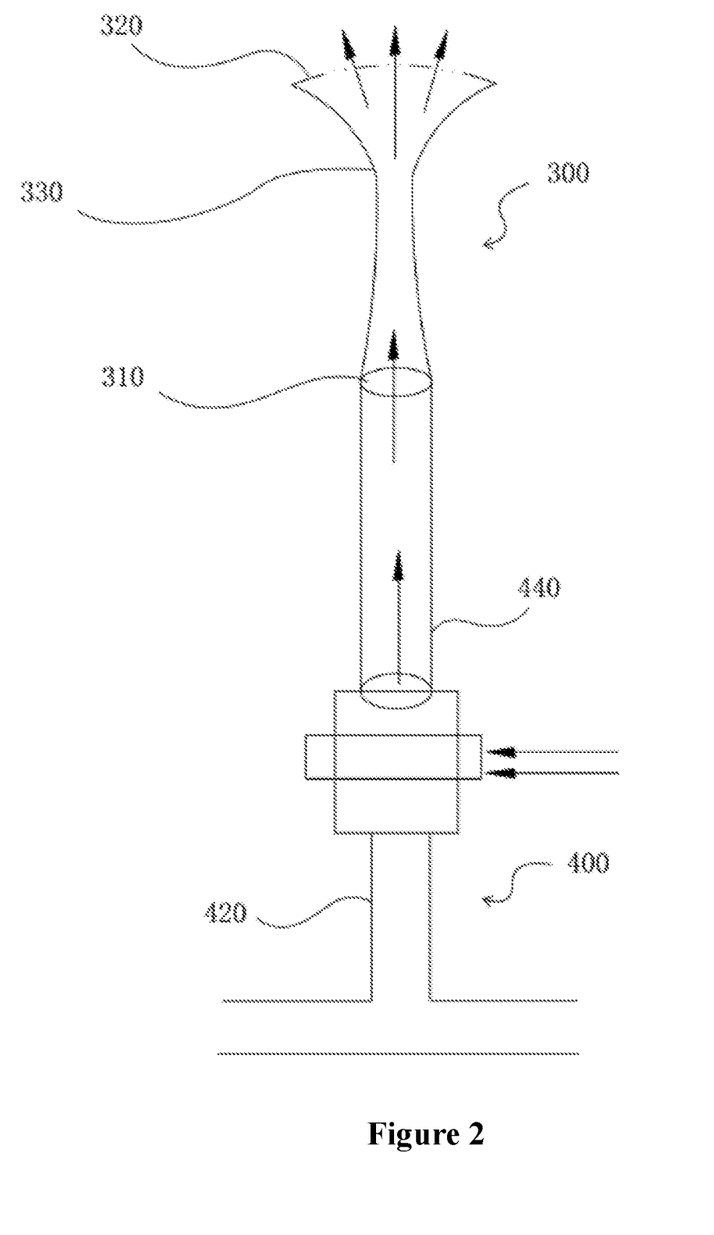
FIG. 2 is a schematic view showing an ejection tube and a vortex tube according to the first embodiment of the present application.

As shown in FIGS. 1 and 2, the airflow conveying device may include multiple ejection tubes 300 arranged at the stator bracket 200, and a nozzle 320 of each of the ejection tubes 300 faces the radial side surface of the stator core 100 opposite to the air gap side for ejecting the cold airflow towards the radial side surface.

According to a first embodiment of the present application, the stator bracket 200 may include a cylindrical enclosure plate 220 located at an outer side, an inner cylinder plate 240 located at a radial inner side of the enclosure plate 220n, and multiple radial rib plates 250 connecting the enclosure plate 220 and the inner cylinder plate 240. A cavity 260 may be formed between the enclosure plate 220 and the inner cylinder plate 240. Multiple stand columns 210 extending axially can be fixedly connected with the rib plates 250, and the stator core 100 can be fastened to the enclosure plate 220 and the stand columns 210. The enclosure plate 220 may be made of a steel plate having a certain thickness, so that the stator core 100 can maintain its shape after being fastened to the stator bracket 200, for example, the stator core 100 is maintained in a ring shape.

As shown in FIG. 1, when the stator core 100 is fastened to the stator bracket 200, an annular gap is formed between the radial side surface of the stator core 100 and the enclosure plate 220. Heat transfer from the stator core 100 to the stator bracket 200 may be affected due to low thermal conductivity of the air, and thus the heat dissipation of the stator core 100 may be hindered to a certain extent due to the gap like this. Therefore, it's beneficial to perform targeted cooling to the gap.

Referring to FIGS. 1 and 2, the ejection tube 300 can be arranged substantially in a radial direction of the stator bracket 200, and the nozzle 320 of the ejection tube 300 is arranged to face the radial inner side surface of the stator core 100. By arranging the ejection tube 300 in the radial direction, the cold airflow can be conveyed to the radial side surface of the stator core 100 opposite to the air gap side substantially in the radial direction of the stator core 100. The "radial direction" herein may be the radial direction substantially, which is not limited to the radial direction absolutely perpendicular to the axial direction or an absolute radius direction of the stator bracket 200, and may have an angle deviation with respect to the radius direction within a certain range.

The ejection tube 300 may be a converging-diverging ejection tube, a converging ejection tube, or other tubes having a constant inner diameter.

Preferably, the ejection tube 300 according to the present application may be a converging-diverging ejection tube, and the ejection tube 300 will be described hereinafter in combination with the drawings by taking the converging-diverging ejection tube as an example. As shown in FIGS. 1 and 2, the ejection tube 300 has an airflow inlet port 310, the nozzle 320, and a throat 330 located between the airflow inlet port 310 and the nozzle 320, and the airflow inlet port 310 may be connected to a cold airflow supply source (which will be described in detail hereinafter). The enclosure plate 220 may be provided with multiple first through holes, and the nozzle 320 of the ejection tube 300 may be arranged to run through the enclosure plate 220 and be clamped in the corresponding first through hole.

Airflow from the cold airflow supply source may enter an internal converging-diverging flow channel of the ejection tube 300 via the airflow inlet port 310 of the ejection tube 300 and get to the nozzle 320, and be ejected from the nozzle 320 to the radial inner side surface of the stator core 100 and the gap between the stator core 100 and the enclosure plate 220, so as to directly cool the radial inner side surface of the stator core 100, and thus effectively solving the problem that the heat dissipation of the stator core is adversely affected due to the gap.

As shown in FIG. 2, a sectional area of the ejection tube 300 may be gradually decreased from the airflow inlet port 310 to the throat 330, and gradually increased from the throat 330 to the nozzle 320. The throat 330 is the narrowest portion of the internal flow channel of the ejection tube 300, the cold airflow from the cold airflow supply source enters into the converging-diverging flow channel of the ejection tube 300 via the airflow inlet port 310, and is accelerated at the throat 330. The accelerated airflow is ejected to the radial inner side surface of the stator core 100 and the gap between the stator core 100 and the enclosure plate 220 via the nozzle 320, so as to cool the stator core 100.

As described above, the ejection tube 300 according to the present application may preferably be a converging-diverging ejection tube, and the ejection tube 300 may also have other shapes, for example, the ejection tube 300 may be a converging ejection tube having an airflow inlet port and a nozzle, and a sectional area of the converging ejection tube may be gradually decreased from the airflow inlet port to the nozzle. The airflow can be accelerated at the nozzle which has a small diameter, and the accelerated airflow may be ejected to the radial side surface of the stator core 100. The converging-diverging ejection tube and the converging ejection tube are only preferred examples of the ejection tube 300 of the present application, and the shape of the ejection tube 300 is not limited thereto. For example, the ejection tube 300 may also be other tubes having a constant inner diameter.

The cold airflow supply source connected to the ejection tube 300 may be the ambient air, the air in the nacelle, or the air from a heat exchanger of the wind turbine and the like.

A vortex tube 400 is provided as the cold airflow supply source of the ejection tube 300 according to the present application. As shown in FIG. 2, the airflow inlet port 310 of the ejection tube 300 may be connected to a cold end of the vortex tube 400, to receive the cold airflow from the vortex tube 400.

Figure 3:
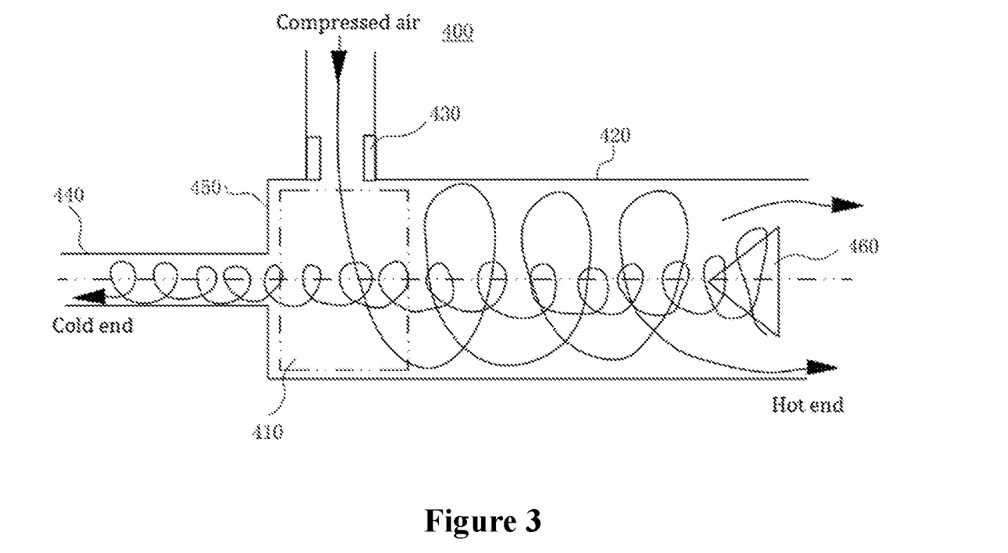
FIG. 3 is a schematic sectional view showing the vortex tube according to the present application.
Figure 4:
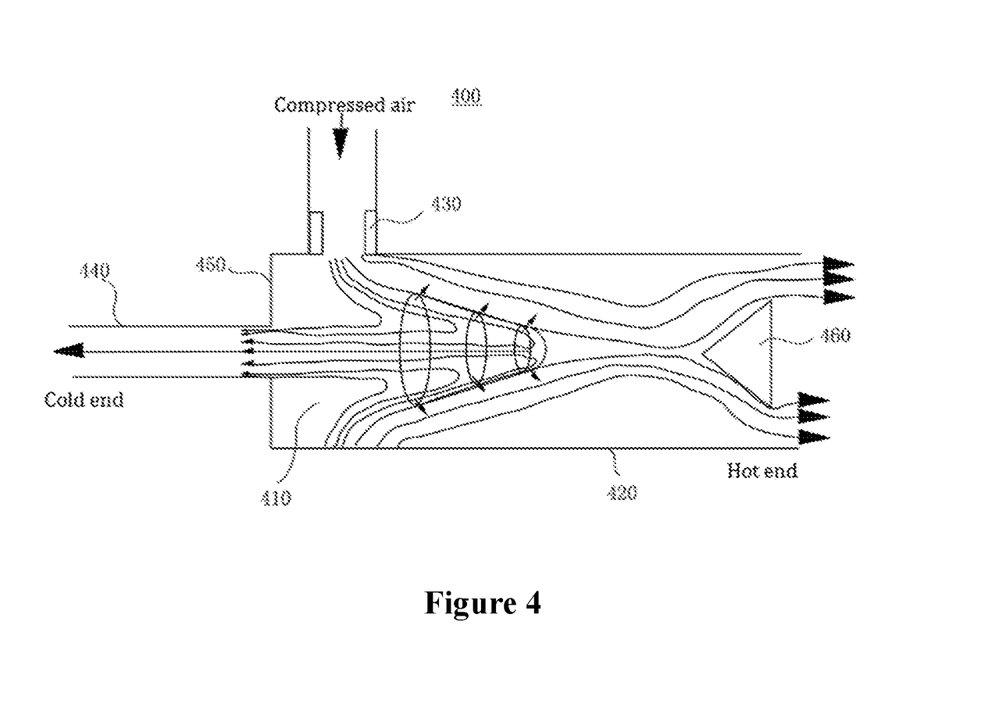
FIG. 4 is a schematic view showing an internal flow field of the vortex tube according to the present application.

The structure of the vortex tube 400 which functions as the cold airflow supply source of the ejection tube 300 will be described in detail below with reference to FIGS. 3 and 4.

The vortex tube 400 may be a tangential entry inner spiral (for example, Archimedes spiral) vortex tube. The vortex tube 400 includes a variable-section flow channel (also known as an ejection tube flow channel) 430, a vortex chamber 410, a cold end orifice plate 450, a cold end tube segment 440, a hot end tube segment 420, and a hot end valve (throttling element) 460. The tangential vortex tube 400 is divided into two portions by the vortex chamber 410, that is, the cold end tube segment 440 and the hot end tube segment 420. The cold end orifice plate 450 is arranged between the vortex chamber 410 and the cold end tube segment 440, and the valve (the throttling element 460) is arranged at an outlet of the hot end tube segment 420. The ejection tube channel 430 is arranged tangential to a radial periphery of the vortex chamber 410. During operation, high pressure air enters the ejection tube channel 430 from an intake tube, expands and accelerates in an internal flow channel of the ejection tube channel 430, and then enters the vortex chamber 410 in a direction tangent to a radial direction of a straight tube segment at a very high speed. A high-speed spiral vortex is formed in the vortex chamber 410. Since there is a pressure difference between the valve (the throttling element 460) mounted at the outlet of the hot end tube segment 420 and the cold end orifice plate 450, backflow is formed at a central region inside the tangential entry inner spiral vortex tube, and the air is separated into two parts of airflow with different total temperatures. The backflow at the central region flows out of the outlet of the cold end tube segment 440 via the cold end orifice plate 450, the temperature of the backflow is greatly decreased (the temperature may be as low as −50° C. to −10° C.)., and cold airflow is formed; spiral airflow at a radial outer layer inside the tangential entry inner spiral vortex tube flows out of a hot end via the valve (throttling member), the temperature rises, and hot airflow is formed. Two streams of airflow, namely, the cold and hot airflow are obtained by a temperature separation effect of one stream of airflow, and there is a wide gap between the temperatures of the two streams of airflow.

In the present application, the cold airflow generated by the vortex tube can be used for heat generation structures (windings and magnetic-conductive components thereof) inside the electric machine, to form an internal cold source; the hot airflow can be used for drying a junction between a root portion of an end portion of the winding and the iron core or drying an inside of the air gap when the wind turbine stops generating power.

As shown in FIG. 2, the airflow inlet port 310 of the ejection tube 300 may be connected to the cold end tube segment (abbr. as the cold segment) 440 of the vortex tube 400. By using the vortex tube 400 as the cold airflow supply source of the ejection tube 300, traditional large-scale fluid machinery (such as a compressor, pump, heat exchanger and the like) that generates and transports a cooling fluid can be omitted, and thus greatly reducing the possibility of failure due to less use of rotating components (such as the compressor or pump) in the wind turbine. The airflow entering into the vortex tube 400 may be high-pressure airflow, air in a tower, ambient air and the like.

Figure 5:
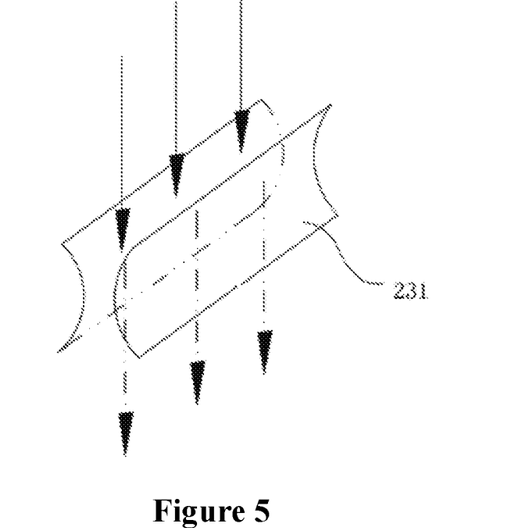
FIG. 5 is a schematic view showing a guide member arranged at an enclosure plate of a stator bracket according to the first embodiment of the present application.

When the cold airflow is ejected from the ejection tube 300 to stator core 100 or the annular gap between the stator core 100 and the enclosure plate 220, heat of the stator core 100 or the annular gap can be taken away by the cold airflow. At the same time, the cold airflow itself is heated, and the heated airflow is required to be transferred out of the annular gap in time and can be recycled and reused. For example, the heated airflow can be applied to other parts of the wind turbine required to be heated. Therefore, a structure capable of transferring the airflow out of the annular gap may be arranged at the enclosure plate 220. As described above, a cavity 260 may be formed between the enclosure plate 220 and the inner cylinder plate 240. The enclosure plate 220 is provided with a second through hole 230 configured to make the annular gap and the cavity 260 be in communication with each other, so that the airflow ejected into the annular gap through the ejection tube 300 can enter the cavity 260 via the second through hole 230. In order to better guide the airflow from the annular gap to enter the cavity 260, as shown in FIG. 1, a guide member 231 as shown in FIG. 5 may be inserted into the second through hole 230 to form a guide channel.

The guide member 231 may be a converging-diverging tube or a converging tube. The guide member 231 may also be an arc-shaped plate embedded in the second through hole 230, as long as a converging-diverging channel or a converging channel can be formed to accelerate the airflow and guide the airflow to enter into the cavity 260

In a situation that the cold airflow (also referred to as first cold airflow) ejected into the annular gap flows back to the cavity 260 via the second through hole 230 or the guide member 231, a flow guide device may be arranged at an axial end of the stator assembly, to guide the airflow heated by the stator core 100 to flow out in the axial direction.

In addition, second cold airflow may be introduced into the cavity 260 in the axial direction, so as to carry the airflow returned to the cavity 260 out of the stator bracket 200. For example, as shown in FIG. 6, the second cold airflow may be introduced into the cavity 260 of the stator bracket 200, the second cold airflow flows in the axial direction of the stator bracket 200 and passes through the cavity 260 of the stator bracket 200, and flows out of the cavity 260 together with the hot airflow which flows back to the cavity 260 from the gap between the stator core 100 and the enclosure plate 220 via the guide member 231 arranged in the second through hole 230.

Figure 6:
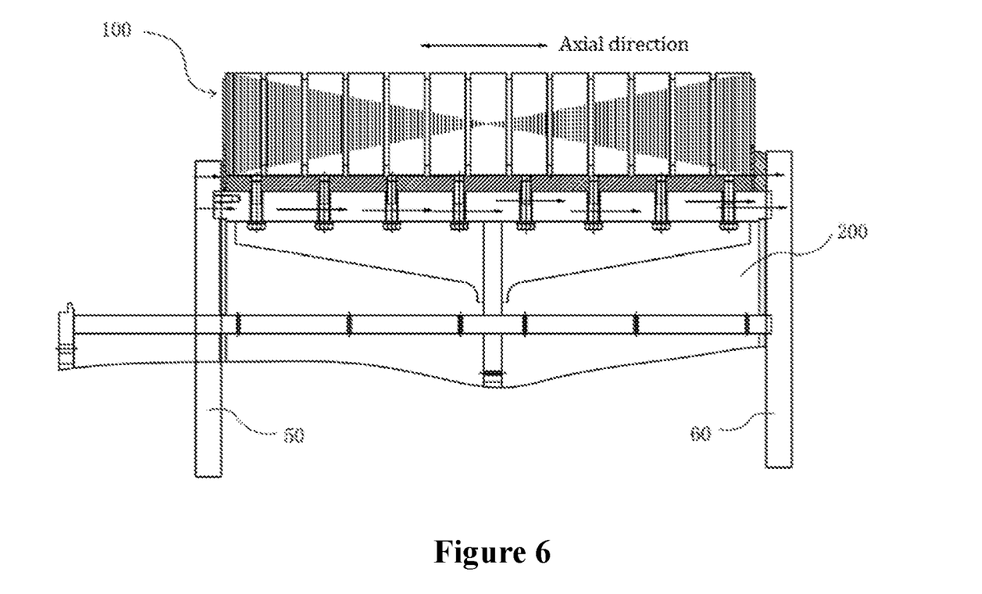
FIG. 6 is a partial sectional view showing the stator assembly according to the present application.

As shown in FIG. 6, the airflow conveying device may include a cold airflow confluence tank 50 and a hot airflow confluence tank 60 arranged at two axial ends of the stator assembly. The cold airflow confluence tank 50 located at one axial end of the stator assembly can receive the airflow from the cold source and convey the cold airflow to the cavity 260 in the stator bracket 200, and the hot airflow confluence tank 60 located at another axial end of the stator assembly can collect the airflow flowing out of the cavity 260, and the airflow collected in the hot airflow confluence tank 60 can be introduced into a heat exchanger in the nacelle of the wind turbine or applied to any other part of the wind turbine.

Herein, when the second cold airflow is introduced into the cavity 260 of the stator bracket 200 to take away the airflow entering the cavity 260 from the annular gap, the ejection tube 300 arranged at the stator bracket 200 and extending in the radial direction in the cavity 260 will become an obstructor in a flow path of the axial airflow, thus increasing flow resistance of the axial airflow to a certain extent. In this case, in order to maximally reduce the flow resistance of the axial airflow, the ejection tube 300 is designed to have a raindrop like aerodynamic shape according to the present application.

Figure 7:
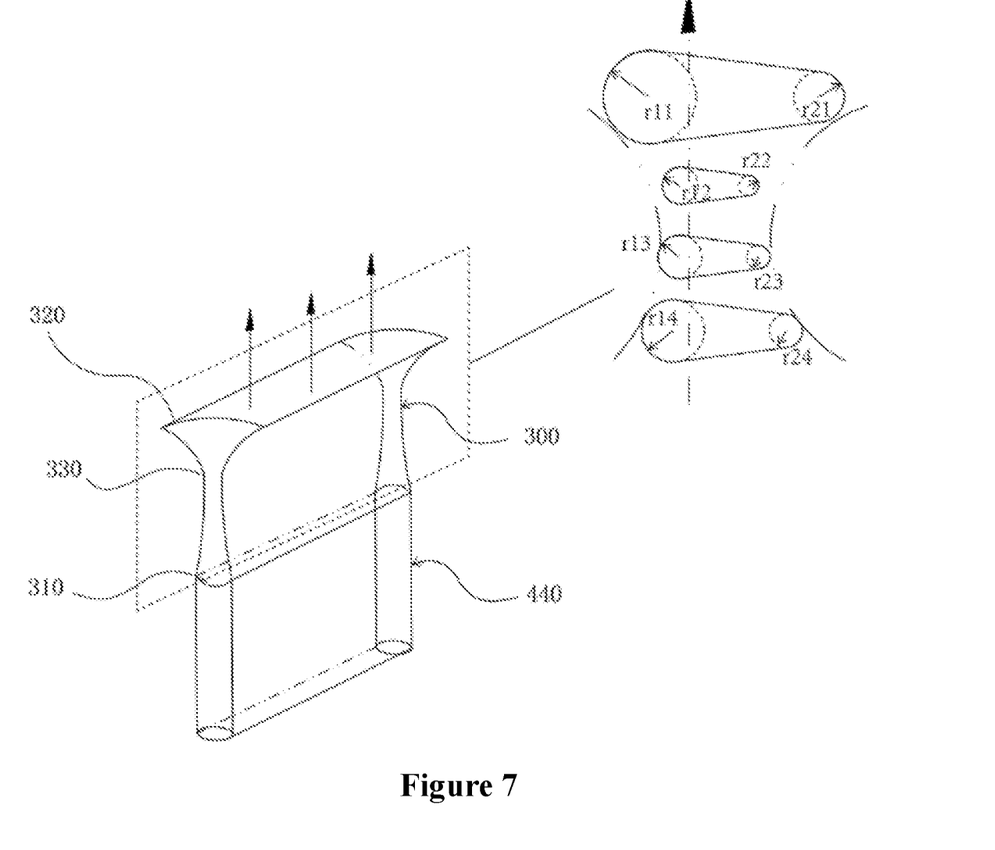
FIG. 7 is a perspective view showing the ejection tube and schematic views showing variable cross-sections of the ejection tube according to the first embodiment of the present application.

As shown in FIG. 7, taking an example that the ejection tube 300 is the converging-diverging ejection tube, a cross-section of the ejection tube 300 may be raindrop-shaped, including a first arc face facing one end of the stator core 100 in the axial direction, a second arc face facing another end of the stator core 100 in the axial direction, and a straight side face tangent to the first arc face and the second arc face.

As shown in FIG. 7, in a length direction of the ejection tube 300, the ejection tube 300 may have cross-sections with various sizes. Schematic views showing cross-sections at four different positions in the length direction are shown at a right side of FIG. 7. As shown in the cross-section views at the right side of FIG. 7, from top to bottom, a first cross-section which is the largest corresponds to the cross-section at the nozzle 320 of the ejection tube 300, a second cross-section which is the smallest corresponds to the cross-section at the throat 330 of the ejection tube 300, a third cross-section corresponds to a cross-section at a certain position between the throat 330 and the airflow inlet port 310 of the ejection tube 300, and a fourth cross-section corresponds to the cross-section at the airflow inlet port 310 of the ejection tube 300. Each cross-section includes a first arc face, a second arc face and a straight side face tangent to the first arc face and the second arc face.

As shown in FIG. 7, from top to bottom, the first cross-section which is the largest has a first semicircle with a radius r11 and a second semicircle with a radius r21, r11>r21, and two tangent lines are connected with the first semicircle and the second semicircle, respectively; the second cross-section which is the smallest has a first semicircle with a radius r12 and a second semicircle with a radius r22; the third cross-section has a first semicircle with a radius r13 and a second semicircle with a radius r23, and the fourth cross-section has a first semicircle with a radius r14 and a second semicircle with a radius r24. When the ejection tube 300 is arranged, the arc faces with larger radiuses are arranged as windward faces and the arc faces with smaller radiuses are arranged as leeward faces with respect to a flow direction of the axial airflow.

Figure 9:
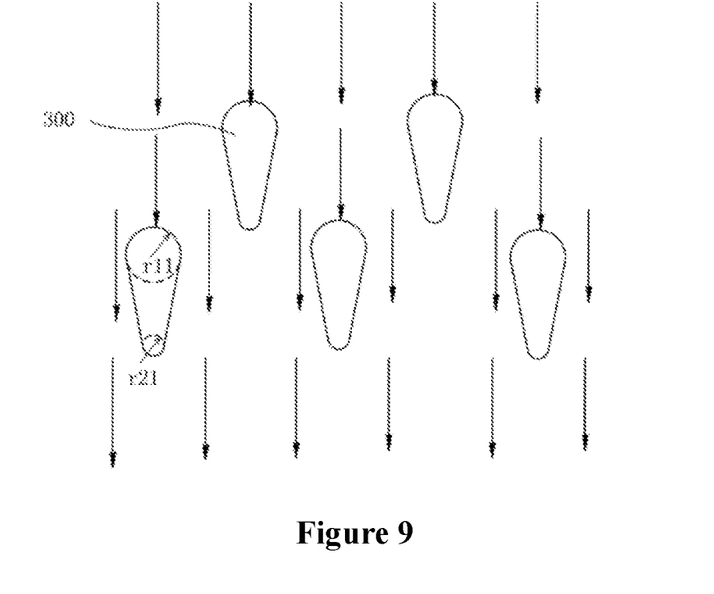
FIGS. 9 and 10 are schematic views showing that airflow flows past peripheries of multiple ejection tubes according to the first embodiment of the present application.
Figure 10:
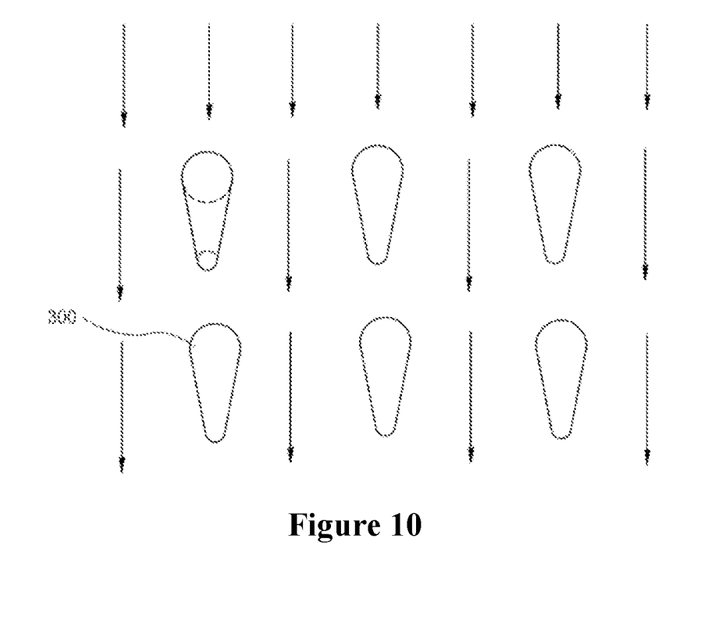

As more clearly shown in FIGS. 9 and 10, the multiple ejection tubes 300 may be arranged in an in-line or staggered manner in the axial direction of the stator core 100, the arc faces with larger radiuses are arranged as the windward faces, and the arc faces with smaller radiuses are arranged as the leeward faces. In FIGS. 9 and 10, an arrow represents the axial airflow in the cavity 260 of the stator bracket 200. When the axial airflow passes by an outer contour of each of the ejection tubes 300, the axial airflow is in contact with a semicircular face of the ejection tube 300 having a larger radius first, and the axial airflow flows along the semicircular face of the ejection tube 300 having the larger radius, and the axial airflow is temporarily separated from an outer surface of the ejection tube 300 at a tangent line located downstream of the semicircular face, vortices fall off at the tangent line, then the vortices are attached to the straight side face and flows along the straight side face, and then separated from the outer surface of the ejection tube 300 along the semicircular face having a smaller radius. The reattachment of airflow of a boundary layer can greatly reduce the flow resistance of the axial airflow.

As shown in FIGS. 9 and 10, the outer contour of the ejection tube 300 in the axial direction is raindrop-shaped, in order to make the airflow inlet port 310 of the ejection tube 300 be connected with the cold segment 440 of the vortex tube (or other cold source), the cold segment 440 may also be raindrop-shaped in the axial direction, which can also reduce the flow resistance of the axial airflow when passing the cold segment 440. As shown in FIG. 7, the cold segment 440 can be connected with the airflow inlet port 310 of the ejection tube 300 in a manner that the cold segment 440 is completely in communication with the airflow inlet port 310. Referring back to FIG. 1, the ejection tube 300 and the cold segment 440 may be arranged in the cavity 260 of the stator bracket 200 together, and the raindrop-like aerodynamic shape of the ejection tube 300 and the cold segment 440 can reduce the flow resistance of the axial flow when passing through the ejection tube 300 and the cold segment 440.

Figure 8:
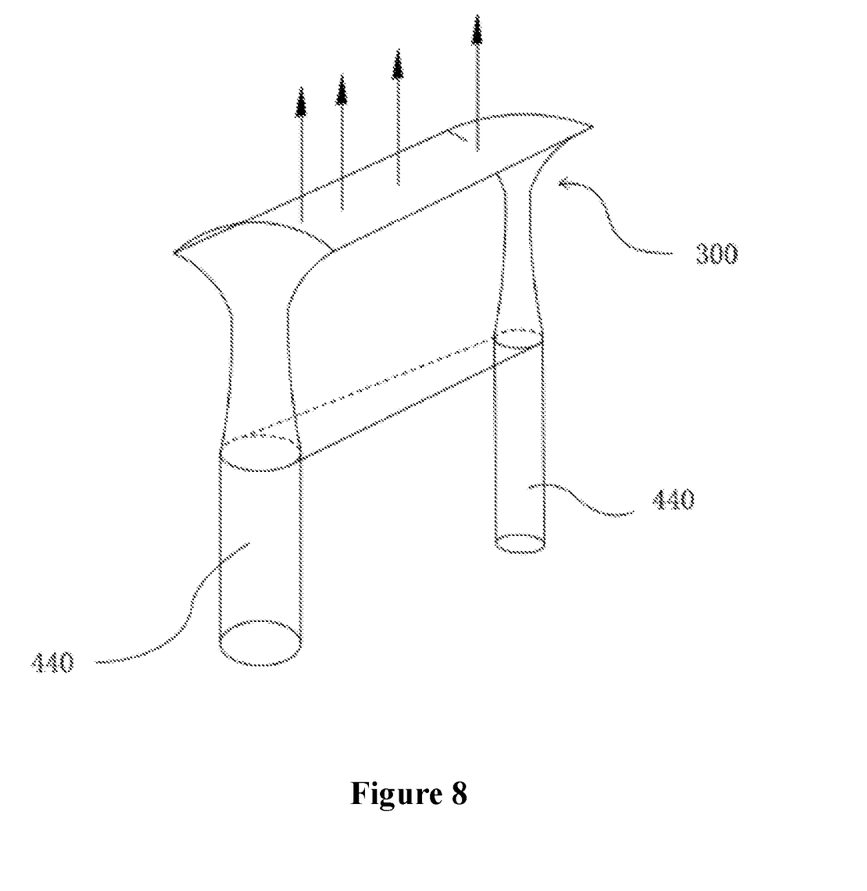
FIG. 8 is a perspective view showing the ejection tube according to the first embodiment of the present application.

In addition, the cold segment 440 may not have the raindrop-like aerodynamic shape. It may be arranged to only allow the ejection tube 300 to be arranged or partially arranged in the cavity 260 of the stator bracket 200, so that the shape of the cold segment 440 will not affect the flow resistance of the axial airflow. In addition, a radial section the cold segment 440 may have an arbitrary shape, and the cold segment 440 may be connected to the ejection tube 300 at a part of the airflow inlet port 310 of the ejection tube 300. For example, as shown in FIG. 8, two separate cold segments 440 are cylindrical tubes respectively, which may be connected to the ejection tube 300 at two axial ends of the airflow inlet port 310, airflow from the cold segments 440 may flow into the ejection tube 300 from the two axial ends, then converge in the ejection tube 300 and reach the nozzle 320 via the converging-diverging flow channel of the ejection tube 300, and then be ejected to the stator core 100.

Although the ejection tube 300 having the raindrop-like aerodynamic shape has been described above by taking the converging-diverging ejection tube as an example, the converging ejection tube described above (having an inner diameter decreasing in the radial direction) may also have a raindrop-like aerodynamic shape.

In the embodiment described above, the airflow conveying device includes the ejection tube 300 arranged at the stator bracket 200, which is used to convey the cold airflow to the radial inner side surface of the stator core 100, to cool the stator core 100 from the radial inner side surface. Multiple ejection tubes 300 may be arranged on the stator bracket 200, and the ejection tube 300 can be used to accelerate the airflow and eject the high-speed airflow directly onto the radial inner side surface, and thus the effective cooling is performed.

However, the present application is not limited to this. For example, the ejection tube 300 may not be provided, and the pressurized cold airflow may be conveyed to the cavity 260 by the airflow conveying device, and enter into the annular gap through one or more first through holes arranged in the enclosure plate 200, so as to cool the stator core 100. After absorbing the heat, the cold airflow introduced into the annular gap may be suctioned out from an axial end of the annular gap.

The embodiment in which the stator bracket 200 includes the enclosure plate 220 and the annular gap exists between the stator core 100 and the enclosure plate 220 are described hereinbefore, and an embodiment in which the stator bracket does not include an enclosure plate is described hereinafter.

Figure 11:
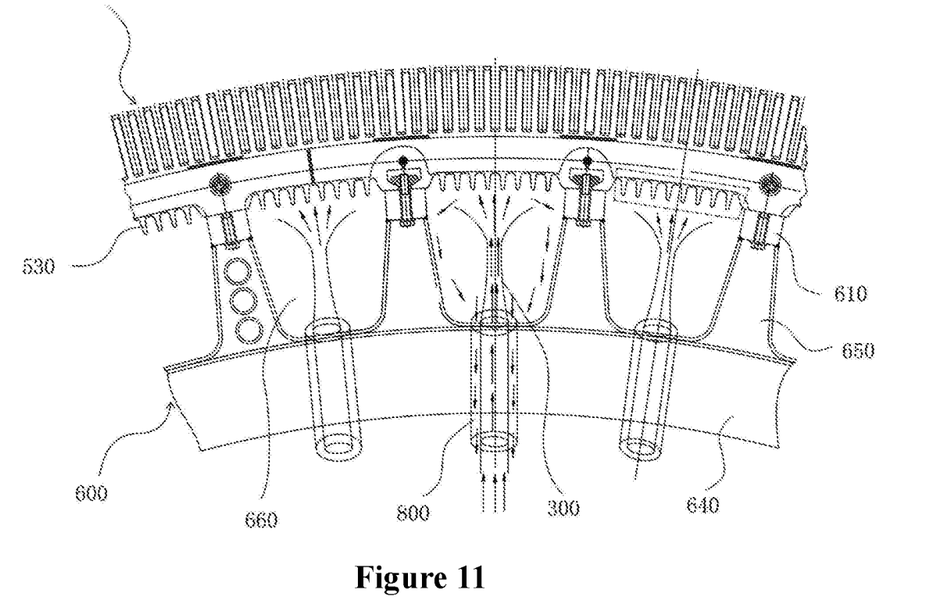
FIG. 11 is a sectional view showing a part of a stator assembly according to a second embodiment of the present application.

As shown in FIG. 11, a stator bracket 600 according to a second embodiment of the present application includes multiple stand columns 610 extending in the axial direction, an inner cylinder plate 640 extending in the axial direction, and multiple rib plates 650 connecting the stand columns 610 and the inner cylinder plate 640. The multiple stand columns 610 are uniformly arranged in the circumferential direction. A stator core 500 is mounted on the stator bracket 600 by being fastened to the multiple stand columns 610. A cavity 660 is formed between a radial side surface (taking the radial inner side surface as an example) of the stator core 500 and the inner cylinder plate 640, and the nozzle 320 of the ejection tube 300 is located in the cavity 660 and faces the radial side surface.

The radial inner side surface of the stator core 500 may be provided with multiple heat dissipation ribs 530 for enhancing heat dissipation. In the present embodiment, when the cold airflow from the cold source flows through the converging-diverging or converging flow channel in the ejection tube 300 to be ejected to the radial inner surface of the stator core 500 via the nozzle 320, the cold airflow is heated while cooling the stator core 500, and the heated airflow returns to the cavity 660 of the stator bracket 600.

Therefore, the airflow conveying device of the stator assembly may include a backflow channel 800 for discharging the air in the cavity 660. For example, the backflow channel 800 may be arranged at the stator bracket 600 to surround an outside of the ejection tube 300, an inlet of the backflow channel 800 is arranged inside the cavity 660, and an outlet of the backflow channel 800 is located outside the cavity 660, so that the airflow in the cavity 660 can be discharged.

It should be understood that, the ejection tube 300 may further include a cold airflow intake tube connected to the airflow inlet port 310, the backflow channel 800 may be arranged to surround an outside of the cold airflow intake tube, or the backflow channel 800 may be arranged to surround an outside of the cold segment 440 of the vortex tube 400 connected to the airflow inlet port 310 (the cold airflow intake tube may be arranged as required). The backflow channel 800 may have a shape like the tube segment it surrounds. The backflow channel 800 may also be arranged at other positions of the stator bracket 600, as long as the airflow can flow out of the cavity 260.

Figure 12:
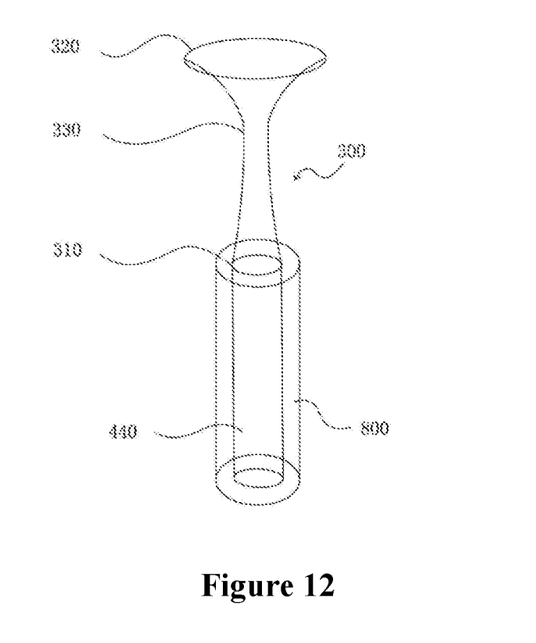
FIGS. 12 and 13 are schematic views showing an ejection tube and a backflow channel according to the second embodiment of the present application.

In the present embodiment, the cross-section of the ejection tube 300 may be circular-shaped, oval-shaped, raindrop-shaped or polygon-shaped. As shown in FIG. 12, the cross-section of the ejection tube 300 may be circular-shaped or oval-shaped. Of course, in the present embodiment, the ejection tube 300 may also have a raindrop-like aerodynamic shape and a raindrop-shaped variable-section as described hereinbefore in the first embodiment (as shown in FIG. 13).

Figure 13:
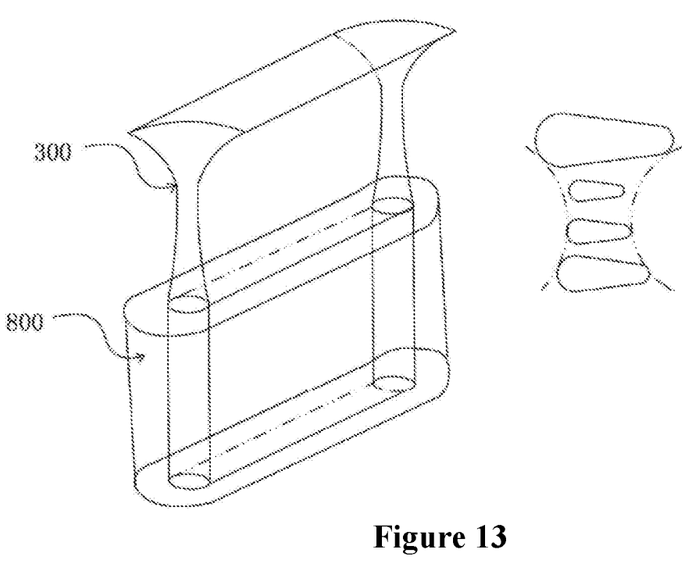

As shown in FIGS. 12 and 13, the backflow channel 800 may be arranged outside the cold segment 440 connecting the ejection tube 300 and has a shape like the cold segment 440. The cold segment 440 may have a cylindrical aerodynamic shape, an elliptic cylindrical aerodynamic shape, a raindrop-like aerodynamic shape or the like.

Although the backflow channel 800 is described in the second embodiment, the backflow channel 800 may also be applied in the first embodiment, that is, in the first embodiment, the backflow channel 800 may also be arranged at the stator bracket 200, and the airflow between the stator core 100 and enclosure plate 220 which is heated by the stator core 100 enters into the cavity 260 through the second through hole 230 and then flows out through the backflow channel 800. In a case that the backflow channel 800 is provided, the axial airflow (that is, the second cold airflow) introduced into the cavity 260 of the stator bracket 200 in the axial direction can also be omitted. In this case, the cross-section of the ejection tube 300 in the first embodiment may also be circular-shaped, oval-shaped, raindrop-shaped or polygon-shaped.

Figure 14:
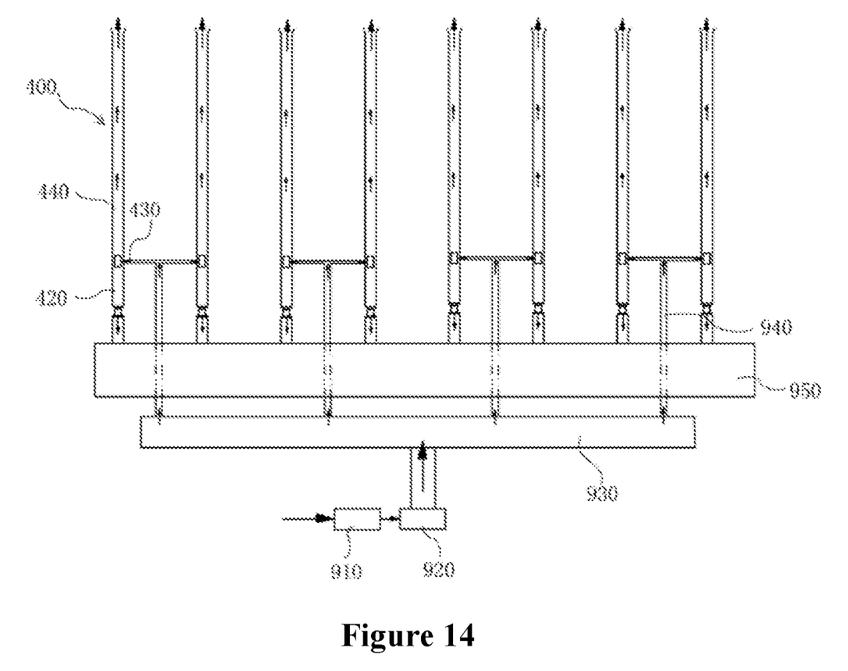
FIG. 14 is a schematic view showing a cold airflow supply unit according to the present application.

FIG. 14 shows a cold airflow supply unit according to an embodiment of the present application. The airflow conveying device as described hereinbefore may include the cold airflow supply unit, including the vortex tube 400 generating the cold airflow as described hereinbefore. As shown in FIG. 14, the cold airflow supply unit further includes a filter 910, a compressor 920 connected with the filter 910, and a compressed air collection tank 930 connected with the compressor 920. The ambient air, the air from the nacelle or the tower or other heat exchangers may become compressed air through the filter 910 and the compressor 920 and then enters into the compressed air collection tank 930. The compressed air in the compressed air collection tank 930 enters into multiple vortex tubes 400 through multiple branch tubes 940. The cold airflow and the hot airflow are formed through the vortex tubes 400, the cold airflow is connected to the ejection tube 300 through the cold segment 440, and the hot airflow is converged in a hot airflow collection tank 950 for requirements of other components.

Cooling the stator core by performing direct convection heat exchange on the radial inner surface of the stator core is described hereinbefore. In addition, heat dissipation capability of the stator core may be further increased by enhancing radiant heat absorbing capacity of the stator bracket. For example, a surface, facing the stator core 100, of the enclosure plate 220 of the stator bracket 200 may be treated to be a chrome black surface, or an outer surface of each of the rib plates 650 of the stator bracket 600 may be treated to be a chrome black surface, to increase emissivity of the outer surface of the stator bracket 200, so as to enhance the radiant heat absorbing capacity of the stator bracket 200, and thereby facilitating the heat dissipation of the stator core.

The ejection tubes according to the first and second embodiments described hereinbefore may be integrally formed in the stator bracket, for example, the ejection tubes may be formed in the stator bracket during the manufacture of the stator bracket, and the ejection tubes integrally formed in the stator bracket may be directly mounted to the tube segment of the cold airflow supply source during a process of assembling components of the electric machine.

The cold airflow supply unit (including the vortex tube) may also be integrally formed in the stator bracket, so that a cooling and ventilation structure for cooling the stator core is integrated in the stator assembly.

Of course, the cold airflow supply unit may also be arranged inside the nacelle. Compared with the structure of the partition-wall type heat exchanger in the conventional technology, the cold airflow supply unit according to the present application has a simple structure and a small flow resistance loss in the airflow transfer process. The cold airflow can be directly supplied to heat generating components required to be cooled, which improves a heat exchange rate of the internal heat generating components.

In the above description, although the embodiments of the present application are described by taking the inner stator structure as an example, the above cooling structure can also be applied to an outer stator structure. By introducing the cold airflow to a side of the stator core opposite to the air gap, both the two radial inner and outer sides of the stator core are cooled, which can effectively prevent the expansion and deformation of the stator core, prevent magnetic poles from being broiled due to high temperature of the stator core, and thereby protecting the magnetic poles and insulating materials in the electric machine.

According to the embodiments of the present application, a method of cooling two radial ends of an electromagnetic device having a cylindrical structure or rotary structure at the same time is employed, which conforms to symmetrical heat transfer in the heat transfer theory and obtains an effect of high-speed heat exchange, and conforms to engineering thermal stress distribution, by virtue of temperature symmetry of structural members (being heated or cooled), the asymmetric expansion and deformation of the structural members are avoided. In addition, the cold source is generated through the vortex tube according to the present application, the vortex tube is a non-rotary element, and the possibility of failure can be significantly lowered by reducing the use of non-rotary elements in the wind turbine. In addition, the vortex tube may also be miniaturized, so as to be conveniently arranged at any suitable position in the wind turbine, which facilitates the cooling of the wind turbine.

Besides, the stator bracket can be directly cooled according to the present application, which reduces the thermal expansion of the stator bracket, and thereby addressing the potential problem that the air gap between the stator and the rotor is narrowed because the stator is pressed due to the thermal expansion of the stator bracket.

Further, the stator bracket also functions as a cooling source for enhancing the heat absorption, which cools a root portion (a bottom portion or an end portion and a space thereof) of the structure of the heat source of the electric machine (the windings and magnetic-conductive components thereof) in the radial direction, so that the heat source of the electric machine (the windings and magnetic-conductive components thereof) has a new cooling and heat dissipation manner of enhancing heat dissipation in the radial direction. Based on energy conservation, strength and share of the radiant heat dissipation released, across a space of the air gap, from an radial outer surface at the air gap side of the heat source of the electric machine (the windings and magnetic-conductive components thereof) to the magnetic poles (permanent magnet poles) of the rotor of the electric machine are indirectly reduced. In this way, insulation of the electric machine is protected, the permanent magnet poles of the electric machine are protected and prevented from temperature rising.

According to the embodiments of the present application, by virtue of the field coordination principle (including jet impingement heat transfer technology) of heat convection in the heat transfer theory, the enhanced heat transfer technology of radiation heat transfer (surface coating), the "tangential entry inner spiral vortex tube" (vortex tube) from the angle of engineering thermodynamics, the surface structure of the radial end portion of the electric machine core and the structure of heat transfer with the cold fluid heat sink are innovated.

The specific embodiments of the present application are described in detail hereinbefore. Although some embodiments have been shown and described, it should be understood by those skilled in the art that, these embodiments can be combined, modified and improved (for example, new technical solution can be obtained by combining different technical features of the present application) without departing from the principles and spirit of the present application of which the scope is defined by the claims, and these combinations, modifications and improvements are also deemed to fall within the scope of the present application.

The invention claimed is:

1. A stator assembly, comprising:
a stator core, comprising:
a first radial side surface adjacent to an air gap between the stator core and a rotor; and
a second radial side surface opposite to the first radial side surface;
a stator bracket supporting the stator core; and
an airflow conveying device configured to convey first cold airflow, in a radial direction of the stator core, to the second radial side surface of the stator core,
wherein the airflow conveying device comprises a plurality of ejection tubes,
wherein the stator bracket comprises an enclosure plate, an annular gap is formed between the second radial side surface of the stator core and the enclosure plate, the enclosure plate is provided with a plurality of first through holes, and the plurality of ejection tubes are inserted in the plurality of first through holes, respectively, and configured to eject the first cold airflow into the annular gap towards the second radial side surface, and
wherein at least a cavity extending axially is formed at a radial inner side of the enclosure plate, and the enclosure plate is provided with a second through hole configured to make the annular gap and the cavity be in communication with each other, to allow the first cold airflow ejected into the annular gap to enter into the cavity through the second through hole.

2. The stator assembly according to claim 1, wherein the plurality of ejection tubes are arranged on the stator bracket, and a nozzle of each of the ejection tubes faces the second radial side surface of the stator core.

3. The stator assembly according to claim 2, wherein each ejection tube is a converging-diverging tube or a converging tube, and a section of the ejection tube is circular-shaped, oval-shaped, raindrop-shaped, or polygon-shaped.

4. The stator assembly according to claim 2, wherein the stator core is mounted on the enclosure plate.

5. The stator assembly according to claim 4, wherein the stator core is mounted at a radial outer side of the enclosure plate, and the cavity is arranged in a circumferential direction of the stator bracket.

6. The stator assembly according to claim 5, wherein a guide member for guiding airflow is mounted in the second through hole, and the guide member is a converging-diverging tube, a converging tube, or an arc-shaped guide plate inserted into the second through hole.

7. The stator assembly according to claim 5, wherein a section of each ejection tube is raindrop-shaped and comprises a first arc face facing one end of the stator core in the axial direction, a second arc face facing another end of the stator core in the axial direction, and a straight side face tangent to the first arc face and the second arc face; and
the plurality of ejection tubes are arranged in an in-line or staggered manner in the axial direction of the stator core, the first arc face of each ejection tube is arranged as a windward face, the second arc face of each ejection tube is arranged as a leeward face, and a radius of the first arc face of each ejection tube is greater than a radius of the second arc face of the ejection tube.

8. The stator assembly according to claim 5, wherein the airflow conveying device further comprises a cold airflow confluence tank arranged at a first end of the stator assembly in the axial direction, the airflow conveying device is configured to convey a second cold airflow supplied by the cold airflow confluence tank to the cavity; and
the airflow conveying device further comprises a hot airflow confluence tank arranged at a second end of the stator assembly in the axial direction, and the second cold airflow is allowed to flow in the axial direction of the stator core and enter into the hot airflow confluence tank.

9. The stator assembly according to claim 5, wherein the airflow conveying device further comprises a backflow channel arranged at the stator bracket, an inlet of the backflow channel is arranged inside the cavity, and an outlet of the backflow channel is located outside the cavity, to allow airflow in the cavity to be discharged from the stator assembly via the backflow channel.

10. The stator assembly according to claim 9, wherein each ejection tube comprises a cold airflow intake tube connected with an airflow inlet port of the ejection tube, the backflow channel is cylinder-shaped, and the backflow channel is arranged to surround an outside of the ejection tube or an outside of the cold airflow intake tube and be fixed at the stator bracket.

11. The stator assembly according to claim 2, wherein the airflow conveying device further comprises a cold airflow supply unit, the cold airflow supply unit comprises a plurality of vortex tubes, the plurality of vortex tubes are arranged at the stator bracket, and an airflow inlet port of each ejection tube is in communication with a cold end of a corresponding vortex tube from the plurality of vortex tubes.

12. The stator assembly according to claim 11, wherein the airflow conveying device further comprises a compressor and a plurality of branch tubes, the compressor is configured to supply compressed air, and the compressed air is supplied to a vortex chamber of a corresponding vortex tube via a corresponding branch tube from the plurality of branch tubes.

13. The stator assembly according to claim 1, wherein the stator core is mounted on the enclosure plate, and the airflow conveying device is configured to allow the first cold airflow to enter into the annular gap via the plurality of first through holes.

14. An electric machine, comprising:
a rotor; and
a stator assembly, comprising:
a stator core, comprising:
a first radial side surface adjacent to an air gap between the stator core and the rotor; and
a second radial side surface opposite to the first radial side surface;
a stator bracket supporting the stator core; and
an airflow conveying device configured to convey first cold airflow, in a radial direction of the stator core, to the second radial side surface of the stator core,
wherein the airflow conveying device comprises a plurality of ejection tubes,
wherein the stator bracket comprises an enclosure plate, an annular gap is formed between the second radial side surface of the stator core and the enclosure plate, the enclosure plate is provided with a plurality of first through holes, and the plurality of ejection tubes are inserted in the plurality of first through holes, respectively, and configured to eject the first cold airflow into the annular gap towards the second radial side surface, and wherein at least a cavity extending axially is formed at a radial inner side of the enclosure plate, and the enclosure plate is provided with a second through hole configured to make the annular gap and the cavity be in communication with each other, to allow the first cold airflow ejected into the annular gap to enter into the cavity through the second through hole.

15. A wind turbine, comprising:
a stator assembly, comprising:
a stator core, comprising:
a first radial side surface adjacent to an air gap between the stator core; and
a rotor and a second radial side surface opposite to the first radial side surface;
a stator bracket supporting the stator core; and
an airflow conveying device configured to convey first cold airflow, in a radial direction of the stator core, to the second radial side surface of the stator core; and
a cold airflow supply unit, coupled to the airflow conveying device for supplying the first cold airflow to the airflow conveying device,
wherein the airflow conveying device comprises a plurality of ejection tubes,
wherein the stator bracket comprises an enclosure plate, an annular gap is formed between the second radial side surface of the stator core and the enclosure plate, the enclosure plate is provided with a plurality of first through holes, and the plurality of ejection tubes are inserted in the plurality of first through holes, respectively, and configured to eject the first cold airflow into the annular gap towards the second radial side surface, and
wherein at least a cavity extending axially is formed at a radial inner side of the enclosure plate, and the enclosure plate is provided with a second through hole configured to make the annular gap and the cavity be in communication with each other, to allow the first cold airflow ejected into the annular gap to enter into the cavity through the second through hole.

16. The wind turbine according to claim 15, wherein the cold airflow supply unit comprises a vortex tube, and a cold end of the vortex tube is in communication with the airflow conveying device for supplying cold airflow to the airflow conveying device.

17. The wind turbine according to claim 16, wherein the airflow conveying device further comprises a compressor and a branch tube, the compressor is configured to supply compressed air, and the compressed air is supplied to a vortex chamber of the vortex tube via the branch tube.

18. A stator assembly, comprising:
a stator core, comprising:
a first radial side surface adjacent to an air gap between the stator core and a rotor; and
a second radial side surface opposite to the first radial side surface;
a stator bracket supporting the stator core; and
an airflow conveying device configured to convey first cold airflow, in a radial direction of the stator core, to the second radial side surface of the stator core,
wherein the airflow conveying device comprises a plurality of ejection tubes, the plurality of ejection tubes are arranged on the stator bracket, and a nozzle of each of the ejection tubes faces the second radial side surface of the stator core,
wherein the stator bracket comprises a plurality of stand columns extending axially, an inner cylinder plate extending axially, and a plurality of rib plates connecting the plurality of stand columns and the inner cylinder plate, and
wherein the plurality of stand columns are uniformly arranged in a circumferential direction, and the stator core is mounted to the stator bracket by being fastened to the plurality of stand columns, a cavity is formed between the second radial side surface of the stator core and the inner cylinder plate, and a nozzle of a corresponding ejection tube from the plurality of ejection tubes is located in the cavity and faces the second radial side surface of the stator core.

19. The stator assembly according to claim 18, wherein the second radial side surface of the stator core is a radial inner side surface of the stator core, the airflow conveying device further comprises a backflow channel configured for discharging airflow in the cavity, the backflow channel is arranged to surround an outside of the corresponding ejection tube, an inlet of the backflow channel is arranged inside the cavity, and an outlet of the backflow channel is located outside the cavity.

20. The stator assembly according to claim 18, wherein a plurality of heat dissipation ribs are formed on the second radial side surface, and an outer surface of each of the plurality of rib plates is treated to be a chrome black surface.

\* \* \* \* \*